United States Patent

Kobayashi

[11] Patent Number: 4,630,705
[45] Date of Patent: Dec. 23, 1986

[54] TRANSMISSION FOR A FOUR-WHEEL DRIVE MOTOR VEHICLE

[75] Inventor: Toshio Kobayashi, Tokyo, Japan

[73] Assignee: Fuji Jukogyo Kabushiki Kaisha, Tokyo, Japan

[21] Appl. No.: 747,508

[22] Filed: Jun. 21, 1985

[30] Foreign Application Priority Data

Jul. 4, 1984 [JP] Japan .................. 59-139336

[51] Int. Cl.$^4$ .................................. B60K 17/34
[52] U.S. Cl. .................... 180/247; 180/233; 74/745
[58] Field of Search ........... 180/233, 247, 248, 249; 74/745

[56] References Cited

U.S. PATENT DOCUMENTS 4,170,273 10/1979 Kodama et al. ............... 180/233
4,458,557 7/1984 Hayakawa ................... 180/233

Primary Examiner—John J. Love
Assistant Examiner—Donn McGiehan
Attorney, Agent, or Firm—Martin A. Farber

[57] ABSTRACT

A transmission has an output shaft, an end portion of which extends out of from a transmission case. A transfer device is provided for transmitting the output of the transmission to auxiliary drive wheels of the vehicle through a rear drive shaft. The transfer device has a transfer drive gear secured to the extended portion of the output shaft and a transfer driven gear mounted on the rear drive shaft and engaged with the transfer drive gear. The extended portion of the output shaft is rotatably supported by a bearing in the transfer case at the outside of the transfer drive gear.

8 Claims, 5 Drawing Figures

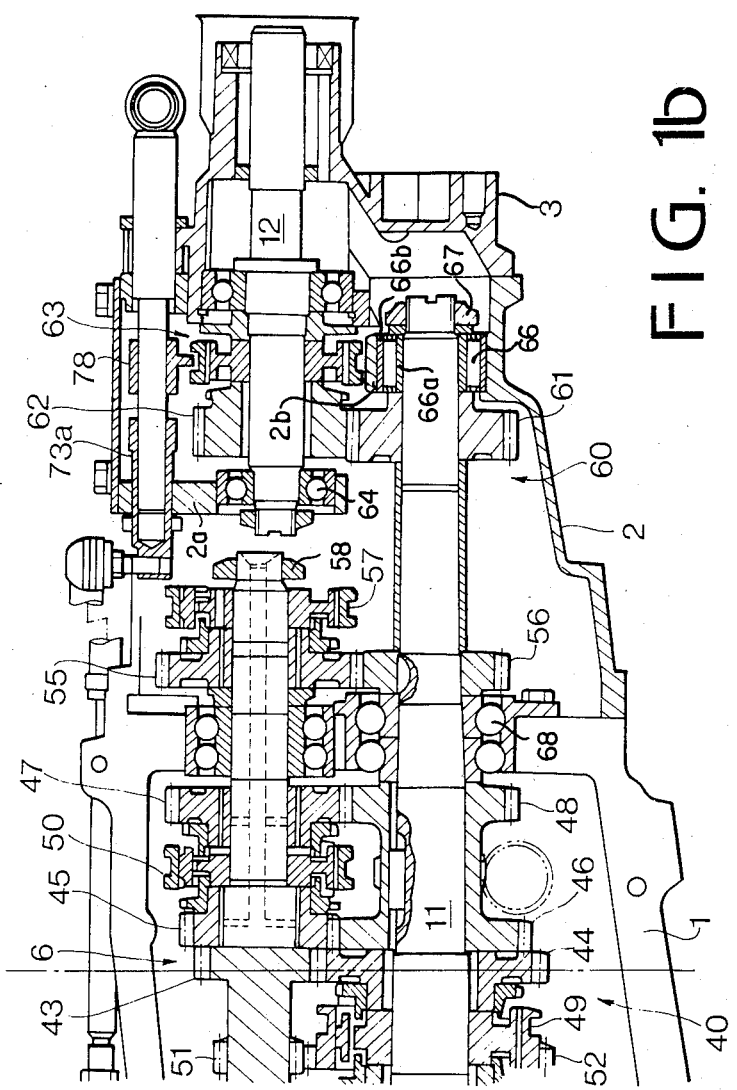

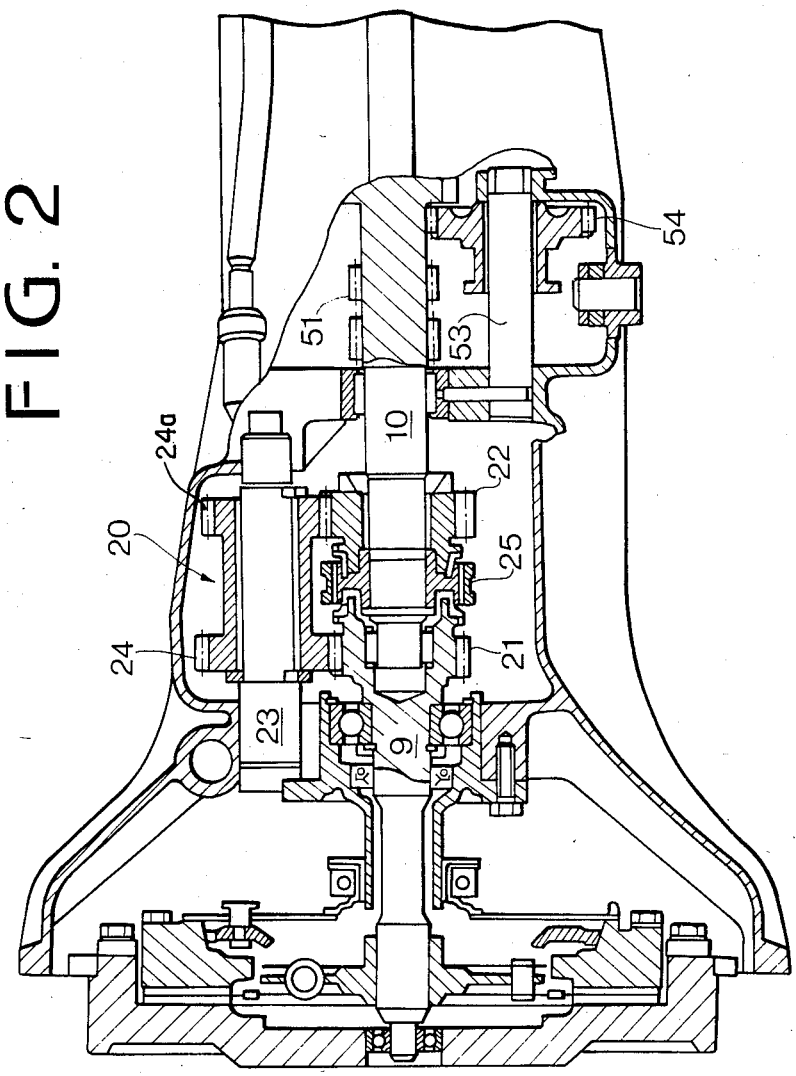

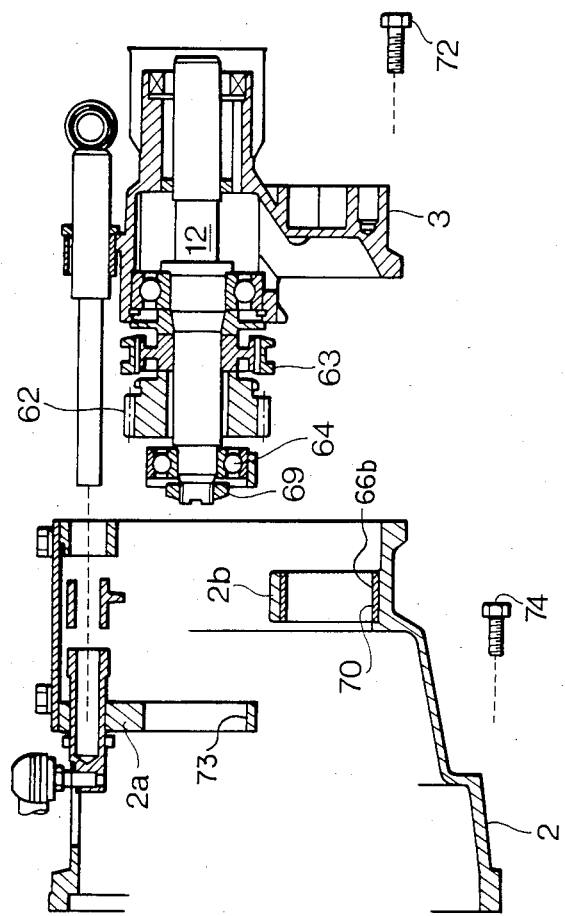

TRANSMISSION FOR A FOUR-WHEEL DRIVE MOTOR VEHICLE

BACKGROUND OF THE INVENTION

The present invention relates to a transmission for a four-wheel drive motor vehicle, which is manually changed from two-wheel drive to four-wheel drive.

U.S. Pat. No. 4,170,273 discloses a transmission for a four-wheel drive motor vehicle having a transfer device for selecting the four-wheel drive. The transmission is a trans-axle type and has a transmission case and a transfer case attached to the rear end of the transmission case for the transfer device. An extension case is secured to the rear end of the transfer case, in which a rear drive shaft is provided. The transfer device comprises a transfer drive gear securely mounted on a rear end portion of an output shaft of the transmission and engaged with a transfer driven gear rotatably mounted on the rear drive shaft. A transfer clutch is mounted on the rear drive shaft for the engagement of the driven gear with the rear drive shaft. A front end portion of the rear drive shaft is rotatably supported by a bearing provided in a bulkhead in the transfer case. The output shaft of the transmission is supported by a bearing provided in the bulkhead, and a rear portion of the output shaft rearwardly extend from the bearing, on which the transfer drive gear is securely mounted. Namely, the output shaft is cantilevered. such a structure causes deflection of the teeth of the transfer drive gear, which will result in noise and fatigue of the gear.

Further, the construction renders the assembly and disassembly of the transmission complicated as described hereinafter. In order to assemble the transfer device, the transfer case is secured to the transmission case; thereafter the transfer drive gear is engaged with a splined portion of the output shaft and secured by a nut. On the other hand, the transfer clutch, the transfer driven gear, and a ball bearing are mounted on the rear drive shaft in the extension case. The portion of the shaft with these members is inserted into the transfer case, engaging the bearing with a hole in the bulkhead and engaging the driven gear with the drive gear. Then the extension case is secured to the transfer case. Disassembling is done in the reverse order. Such assembling that the transfer drive gear is secured to the output shaft, after the transfer case is secured to the transmission case, renders the work very complicated, causing a decrease of workability in assembly and reparing of the transmission.

SUMMARY OF THE INVENTION

An object of the present invention is to provide a transmission in which an end portion of an output shaft of the transmission is supported at the outside of a transfer drive gear.

Another object of the present invention is to provide a transmission which may be easily assembled, thereby improving assembly and repair of the transmission.

The other objects and features of this invention will be understood from the following description with reference to the accompanying drawings.

BRIEF DESCRIPTION OF THE DRAWINGS

FIG. 1a and 1b together is a longitudinal sectional view showing a transmission for a four-wheel drive motor vehicle, to which the present invention is applied;

FIG. 2 is a horizontal sectional view of a part of the transmission of FIG. 1; and FIG. 3a and 3b are exploded sectional views for explaining the assembling of the transmission.

DETAILED DESCRIPTION OF THE PREFERRED EMBODIMENT

Figure 1A:
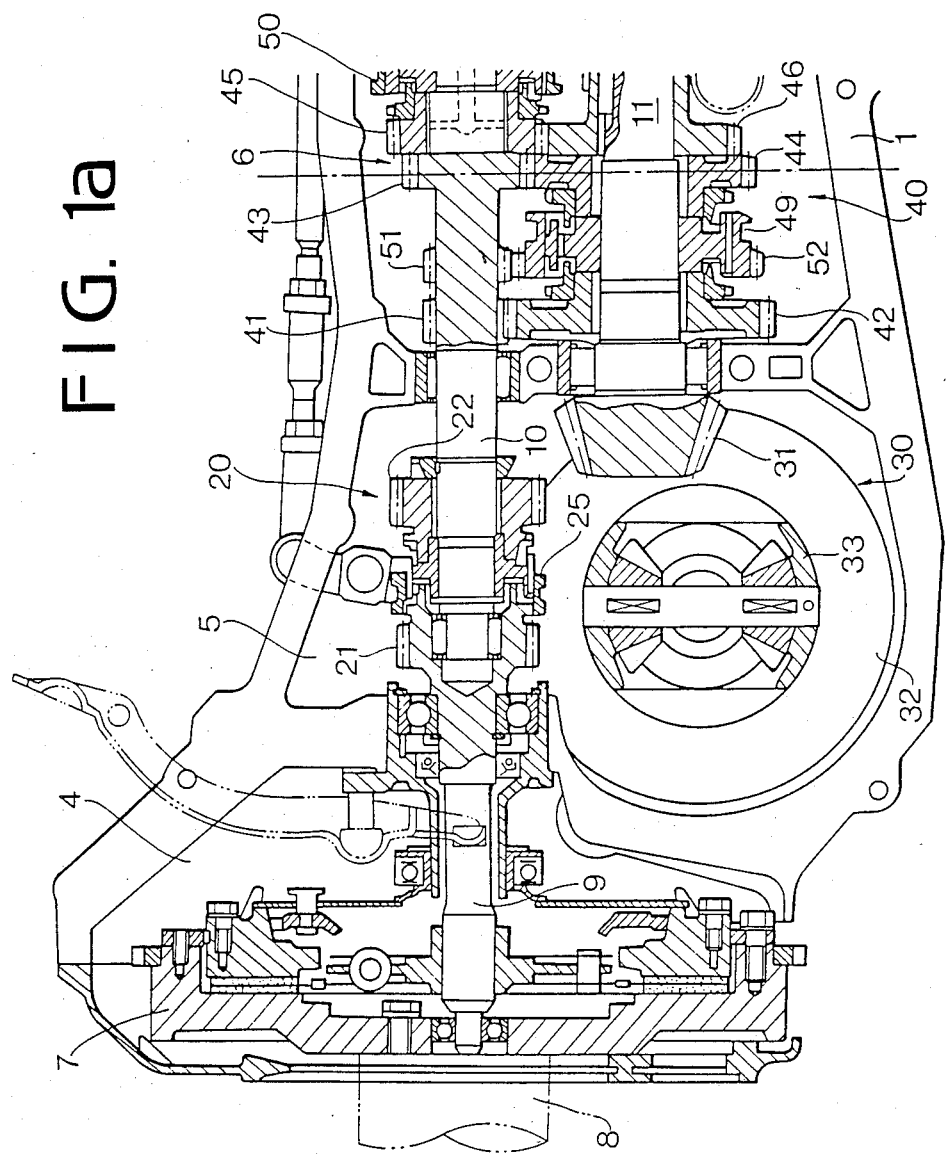

Referring now to the drawings, and more particularly to FIGS. 1a, 1b and 2, there is illustrated a longitudinally disposed trans-axle type transmission for a four-wheel drive motor vehicle. The transmission comprises a transmission case 1, a transfer case 2 secured to the case 1 at a rear end thereof, and an extension case 3 secured to the case 2. The transmission case 1 comprises a pair of longitudinally divided shells and the inside thereof is divided into three compartments 4 to 6. A clutch 7 is provided in the forward compartment 4, and a sub-transmission 20 and a front differential 30 are arranged in the middle compartment 5. A main transmission 40 is provided in the compartment 6 and case 2, and a transfer device 60 is disposed in the case 2. In the driving system, a crank shaft 8 of an engine (not shown) is operatively connected to an end of an input shaft 9 through the clutch 7 and the sub-transmission 20 is disposed between the input shaft 9 and a main drive shaft 10 of the main transmission 40.

The sub-transmission 20 comprises a high speed gear 21 formed on the input shaft 9, a low speed gear 22 rotatably mounted on the main drive shaft 10 in alignment with the shaft 9, counter gears 24 and 24a (FIG. 2) rotatably mounted on a counter shaft 23, and engaged with both gears 21 and 22, respectively, and a synchronizer 25 as a clutch disposed between the high speed gear 21 and the low speed gear 22 on the main drive shaft 10. As shown in FIG. 1, when the synchronizer 25 is engaged with the high speed gear 21, the shaft 9 is directly coupled to the shaft 10 to provide a higher speed drive range, and, to the contrary, when the synchronizer is engaged with the low speed gear 22, the gear 21 is connected to the shaft 10 through gears 24, 24a and 22 to provide a lower speed drive range. The main transmission 40 is a five-speed transmission with overdrive, in which an output shaft 11 is arranged below the drive shaft 10 in parallel with it. First gears 41 and 42, second gears 43 and 44, third gears 45 and 46, and fourth gears 47 and 48 are provided on both shaft 10 and 11. The first and second driven gears 42 and 44 are rotatably mounted on the output shaft 11 and a synchronizer 49 is disposed between the driven gears. The third and fourth drive gears 45 and 47 are rotatably mounted on the main drive shaft 10 and a synchronizer 50 is disposed between the drive gears. For reverse driving, an idler gear 54 is slidably mounted on a shaft 53 as shown in FIG. 2, and adapted to be engaged with a drive gear 51 on the drive shaft 10 and with a driven gear 52 on the sleeve of the synchronizer 49. In addition, the main transmission has fifth speed gears 55 and 56 between the main drive shaft 10 and the output shaft 11, and a synchronizer 57 arranged between the rotatable drive gear 55 and the shaft 10. A drive pinion 31 is formed at the front end of the shaft 11 and engaged with a crown gear 32 of a front differential 30 and a differential gear device 33 of the front differential 30 is coupled to front wheels of the vehicle.

In the transfer case 2, a supporting wall 2a is provided. A rear drive shaft 12 which is operatively connected to rear wheels of the vehicle is rotatably supported by a ball bearing 64 provided in the wall 2a. The output shaft 11 is rotatably supported by a ball bearing 68 at a portion between gears 48 and 56 and a sleeve 65 is mounted on the output shaft adjacent to the fifth gear 56. A transfer drive gear 61 is securely mounted on the output shaft 11 adjacent to the rear end of the sleeve 65 with splines. A rear end portion of the output shaft 11 is rotatably supported by a needle bearing 66 provided in a supporting wall 2b formed in the transfer case 2. The needle bearing 66 is secured by a lock nut 67. The transfer drive gear 61 engages with a transfer driven gear 62 rotatably mounted on the rear drive shaft 12. A transfer in clutch 63 of a synchronizer device is slidably mounted on the rear drive shaft 12 so as to engage the transfer driven gear 62 with the shaft 12.

The operation of the apparatus will now be explained. When a select lever (not shown) is positioed to select the front wheel drive, the transfer clutch 63 is disengaged. On the other hand, the synchronizer 25 engages with the high speed gear 21. Thus the power of the engine is transmitted to front wheels through the high speed gear 21, transmission 40, and front differential 30, thereby to establish the two-wheel drive for the motor vehicle.

When the select lever is shifted to select high speed four-wheel drive, the clutch 63 engages with the gear 62. Thus, the power transmitted from the main transmission 40 is transmitted also to the rear wheels through the transfer device 60 and the rear drive shaft 12, so that the four-wheel drive in the higher speed range (in the lower gear ratio range) is established. When the select lever is further shifted to select low speed range four-wheel drive, the synchronizer 25 engages with the low speed gear 22, so that the four-wheel drive in the lower speed range (in the higher gear ratio range) is established.

Figure 3A:
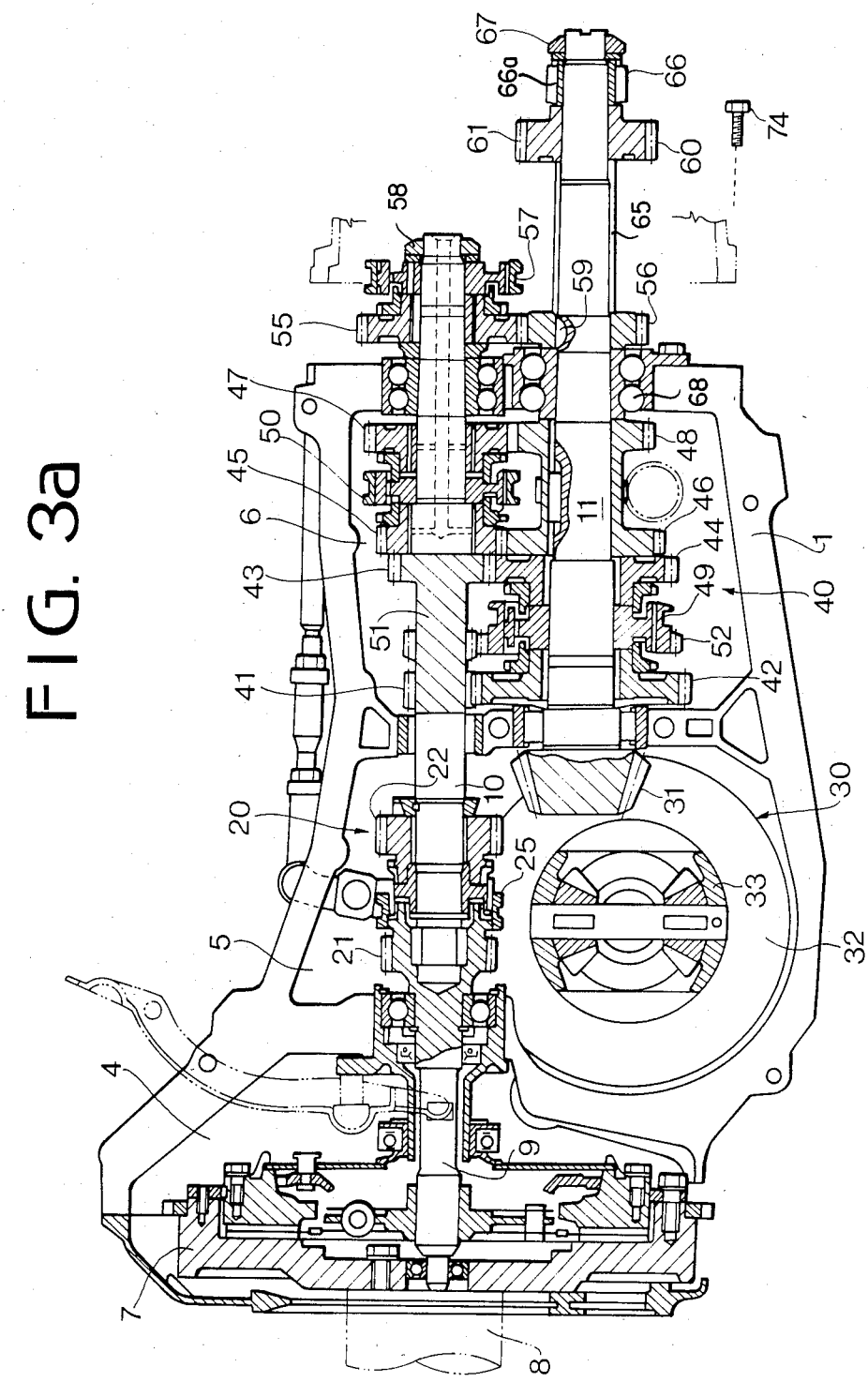

Explaining the assembling work of the transfer device, the inside gears and other elements of the main transmission are assembled as shown in FIG. 3a. The fifth gear 55 and synchronizer 57 are mounted on the rearwardly extended portion of the shaft 10 and secured by a lock nut 58. The sleeve 65 and the transfer drive gear 61 are engaged with the rearwardly extended portion of the output shaft 11, and the inner ring 66a of the needle bearing 66 is engaged with a rear end portion and secured by the lock nut 67.

On the other hand, in the extension case 3, the transfer clutch 63, transfer driven gear 62 and ball bearing 64 are engaged with the rear drive shaft 12 and secured by a lock nut 69. The extension case 3 is secured to the transfer case 2 by bolts 72, engaging the bearing 64 with a hole 73 formed in the supporting wall 2a of the transfer case 2. Thereafter, the transfer case 2 is secured to the case 1 of the main transmission by bolts 74, engaging the transfer drive gear 61 with the drive gear 62 and engaging the inner ring 66a of the needle bearing 66 with an outer ring 66b there of which is secured in a hole 70 formed in the supporting wall 2b. Thus, the transmission is completely assembled.

From the foregoing, it will be understood that the extended portion of the output shaft 11 in the transfer device 60 is supported at both sides of the transfer drive gear 61, so that deflection of teeth of the transfer drive gear can be prevented to effect silent operation and long life of the transfer device. Further, the transfer drive gear is secured to the output shaft, before the transfer case 2 is secured to the transmission case 1, whereby assembling of the transmission is facilitated.

While the presently preferred embodiment of the present invention has been shown and described, it is to be understood that this disclosure is for the purpose of illustration and that various changes an modifications may be made without departing from the spirit and scope of the invention as set forth in the appended claims.

What is claimed is:

1. In a transmission system for a four-wheel drive motor vehicle having a transmission disposed in a transmission case, the transmission having an output shaft rotatably supported in said transmission case, an end portion of the output shaft extending out of the transmission case and constituting an extended portion of the output shaft, and a transfer device disposed in a transfer case for transmitting the output of the transmission to auxiliary drive wheels of the vehicle through an auxiliary drive shaft, the transfer device comprising a transfer drive gear secured to the extended portion of the output shaft of the transmission and a transfer driven gear mounted on the auxiliary drive shaft and engaged with the transfer drive gear, the improvement in the system wherein the transfer case has a wall forming a hole,
a bearing having an outer ring and an inner ring,
said outer ring being disposed in said hole and secured to said wall of the transfer case, and
said inner ring being mounted on said extended portion of the output shaft on a side of the transfer drive gear facing away from said transmission case,
a nut engageable with said extended portion of the output shaft,
said extended portion of the output shaft being inserted into said outer ring with the inner ring being secured to said extended portion of the output shaft by said nut engaged on said extended portion of the output shaft, so that the extended portion of the output shaft is rotatably supported by said bearing at said side of the transfer drive gear facing away from said transmission case.

2. The system as set forth in claim 1, wherein
the transfer case is securable to said transmission case,
said transfer drive gear is secured to the extended portion of the output shaft before the transfer case is secured to said transmission case.

3. The system as set forth in claim 1, wherein
said bearing is a needle bearing.

4. The system as set forth in claim 3, further comprising
a sleeve on said extended portion of the output shaft between said transfer drive gear and said transmission case.

5. The system as set forth in claim 1, further comprising
bearing means for rotatably supporting said output shaft at an end portion of said transmission case adjacent said transfer case.

6. The system as set forth in claim 1, wherein
said inner ring on said extended portion of the output shaft is engaged with said outer ring when said transfer case is secured to said transmission case.

7. A method for assembling a transmission system for a four-wheel drive motor vehicle, the system having a transmission disposed in a transmission case, the transmission having an output shaft rotatably supported in said transmission case, an end portion of the output shaft extending out of the transmission case and constituting an extended portion of the output shaft, to a transfer device, the latter being disposed in a transfer case for transmitting the output of the transmission to auxiliary drive wheels of the vehicle through an auxiliary drive shaft, the transfer device comprising a transfer drive gear securable to the extended portion of the output shaft of the transmission and a transfer driven gear mounted on the auxiliary drive shaft and engageable with the transfer drive gear, comprising the steps of first assembling the transmission in said transmission case, securing the transfer drive gear to the extended portion of the output shaft, securing an inner ring of a bearing on said extended portion of the output shaft on a side of the transfer drive gear facing away from said transmission case, mounting an outer ring of the bearing on said transfer case in a hole of the latter, positioning said transfer case against said transmission case such that said inner ring is positioned inside said outer ring of the bearing, and securing said transfer case to said transmission case so that said inner ring engages with said outer ring.

8. The method as set forth in claim 7, further comprising the steps of assembling an extension case containing said auxiliary drive shaft and said transfer driven gear, securing said extension case to said transfer case prior to said positioning step such that the transfer drive gear engages with said transfer driven gear upon said positioning and subsequent securing steps.

* * * * *